United States Patent [19]

Shippee

[11] 4,324,228

[45] Apr. 13, 1982

[54] SOLAR HEATING APPARATUS

[76] Inventor: Paul Shippee, 934 Pearl St., Boulder, Colo. 80306

[21] Appl. No.: 176,785

[22] Filed: Aug. 11, 1980

[51] Int. Cl.³ .................................................. F24J 3/02
[52] U.S. Cl. .................................... 126/437; 126/420; 126/435
[58] Field of Search ............... 126/420, 421, 422, 426, 126/435, 437, 450; 138/26, 27, 28, 30; 137/59, 61

[56] References Cited

U.S. PATENT DOCUMENTS

| | | | |
|---|---|---|---|
| 3,148,706 | 9/1964 | Mercier | 138/30 |
| 4,108,160 | 8/1978 | Harper | 126/435 |
| 4,153,043 | 5/1979 | Goolsby | 126/437 |
| 4,193,543 | 3/1980 | Viesturs | 126/437 |
| 4,194,491 | 3/1980 | Randall | 126/450 |

FOREIGN PATENT DOCUMENTS

| | | | |
|---|---|---|---|
| 2809690 | 9/1979 | Fed. Rep. of Germany | 126/417 |
| 2394034 | 2/1979 | France | 126/422 |

*Primary Examiner*—James C. Yeung
*Attorney, Agent, or Firm*—Sheridan, Ross & McIntosh

[57] ABSTRACT

A heating apparatus which uses solar energy to heat a solar energy working fluid moving through a solar collector is provided. The heating apparatus includes an outer tank and an inner tank completely contained within the outer tank. The inner tank is surrounded by the solar energy working fluid held by the outer tank. The wall of the inner tank acts as a heat exchanger wherein fluid from an outside source is contained in the inner tank and heated by the solar energy working fluid. The outer tank includes a resilient lid to enable the volume of the outer tank to be varied. When the temperature of the solar energy working fluid increases, the lid expands to prevent pressure increases within the outer tank. A transport line carries the solar energy working fluid to and from the outer tank. When portions of the transport line are to be drained, a section of the transport line provides an air path to assure proper drainage thereof.

1 Claim, 2 Drawing Figures

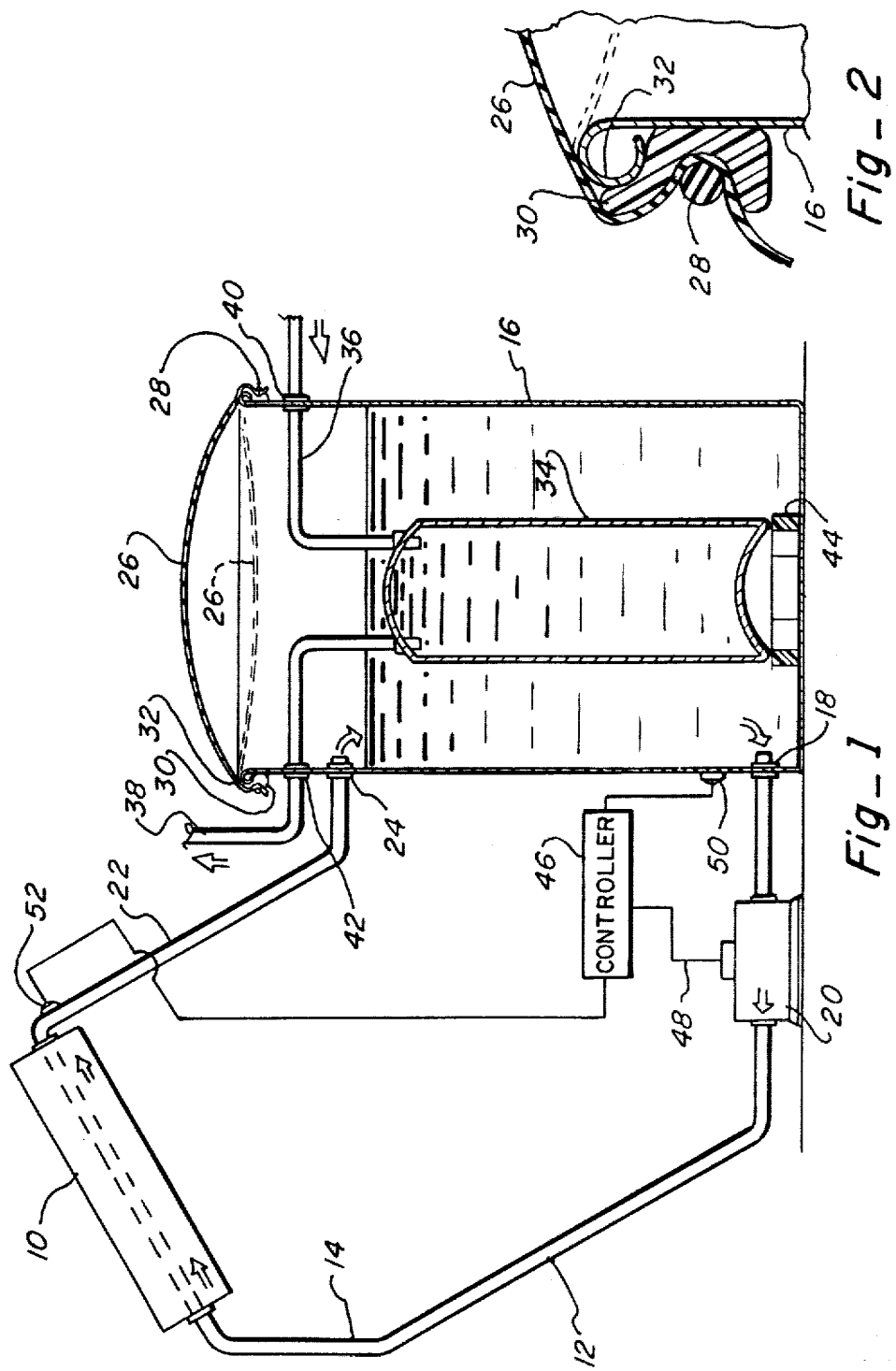

SOLAR HEATING APPARATUS

FIELD OF THE INVENTION

The present invention relates to an apparatus which utilizes solar energy and, in particular, to an apparatus for using solar energy to heat a fluid which is conveyed to a variable volume, fluid holding outer tank surrounding an inner tank heat exchanger.

BACKGROUND ART

Numerous and varied configurations for using the energy of the sun to heat a fluid have been practiced. The greatly increased cost of other forms of energy has recently given new impetus to devising more inexpensive and efficient ways to harness and use solar energy. In the field of heating water in a tank by means of solar energy, a substantial portion of the implemented designs employ previously developed technology and materials. Solar water heating systems have been provided which use a solar heated anti-freeze fluid which is carried to a heat exchanger in a closed loop system. The closed loop system is generally characterized as a system in which the transport or conveying pipes constantly contain fluid. This type of solar heating system greatly minimizes the risk of the fluid freezing in the transport pipes when the flow of the fluid is halted. On the other hand, the cost of anti-freeze and periodic inspection and maintenance requirements associated therewith greatly increase the expense of the heating system. In addition, the toxicity of the anti-freeze in proximity with the water to be heated, albeit separated by presumably impervious barriers, provides at least some risk of an unwanted mixing of toxic anti-freeze and potable water. To minimize this risk, recent building codes require a double thickness heat exchanger which considerably reduces the heat exchange efficiency. Other solar systems circumvent the need for an anti-freeze fluid by draining the fluid from the outdoor located solar collector and transport lines when the system is not operating and the fluid is not moving through the transport lines. This is accomplished by means of gravity and by placement of portions of the transport lines above the level of the solar heated working fluid contained in a storage tank. In this draining embodiment, however, an air vent in the conveying lines is usually provided. As a consequence, air is constantly mixed with the fluid. The oxygen in the air can cause the inner wall of the storage tank and other bare steel components to corrode or rust. Additionally, the pumping mechanism which drives the fluid through the conveying lines can also corrode. Stainless steel materials can be used to obviate the problem of rust. But this material substantially increases the cost of the water heating system. In another alternative design, a solar water heating system includes a pair of fluid containing tanks. A rigid inner tank is surrounded by a rigid outer tank with a space therebetween for containing solar heated water. The wall of the inner tank acts as a heat exchanger for receiving the solar energy collected by the solar heated water. The inner tank contains the water to be heated which is then dischargable when desired for use. Both the inner tank and outer tank are fixed in shape and must be constructed of sufficiently strong and thick materials. The inner tank is subject to pressure from the incoming pressurized water flowing into the inner tank. The outer tank must be capable of withstanding the increasing pressure provided by the air space located above the level of the water in the outer tank which expands when heated. Again, the use of two relatively thick, rigid tanks increases the cost of the system. In addition, the possibility of the inner tank leaking and thereby adding water to the outer tank presents the risk of additional pressure within the outer tank which may cause a rupture of the outer tank.

The solar water heater of the present invention seeks to minimize the cost thereof, while maintaining the requisite efficiency inherent in an inner-outer tank configuration, and yet overcoming the aforementioned cost, pressure and corrosion problems. Basically, the present invention includes a variable volume outer tank which continuously minimizes the pressure resulting from the heated solar water. The outer tank also has a transport or conveying line connected thereto to permit movement of the air from the air space above the level of the solar heated water to the transport line in the solar collector for replacing the fluid therein. Yet, no air outside of the heating system is introduced into the conveying line. As a result, corrosion of the system components is also minimized.

SUMMARY OF THE INVENTION

In accordance with the present invention, a solar water heating apparatus is provided. The apparatus includes a solar energy collector mounted advantageously for receiving the energy of the sun. A transport or conveying line is joined to the solar collector for carrying solar energy working fluid heated by the sun. The transport line includes a first channel which conveys the solar energy working fluid from an outer tank into the transport line portion housed in the solar collector. The transport line further includes a second channel which conveys the solar energy working fluid from the solar collector to the outer tank. The apparatus further includes an inner tank of a smaller diameter than the outer tank and housed within the outer tank. The inner tank receives and contains fluid from a source outside of the solar water heating apparatus. The solar energy working fluid heats the fluid contained in the inner tank since the wall of the inner tank acts like a heat exchanger. The outer tank includes an expandable lid fastened to its top portion to minimize the pressure exerted by an air space within the outer tank. The air space is located above the level of the solar energy working fluid contained within the outer tank.

More particularly, the present invention includes a generally cylindrical inner tank and a generally cylindrical outer tank completely surrounding the inner tank. The outer tank is of a greater height than the inner tank such that solar energy working fluid substantially surrounds the outer wall of the inner tank. The inner tank includes an inlet member for receiving fluid from an outside source of fluid and an outlet member for discharging the fluid from the inner tank. The temperature of the solar energy working fluid is increased in a solar collector and, by means of a transport line, this fluid is transported to the outer tank. The wall of the inner tank acts as a heat exchanger and the solar energy working fluid heats the fluid contained in the inner tank. The outer tank has a top portion and a bottom portion. A lid is sealably fastened to the top portion. The lid is non-rigid and expandable so that the pressure increases within the outer tank, due to the heated solar energy working fluid and the heated air space contained above the working fluid, are minimized. The transport line includes a first channel joined between a first side of the solar collector and the bottom portion of the outer tank. A pump is joined between portions of the first channel to drive the solar energy working fluid from the bottom portion of the outer tank through the transport line. The transport line further includes a second channel joined between a second side of the solar collector and the top portion of the outer tank. The solar collector is mounted vertically above the outer tank such that, when the solar energy working fluid is drained from portions of the transport line, the level of the solar energy working fluid in the outer tank is below the outlet end of the second channel. The working fluid exits into the outer tank from the outlet end. The second channel also transports air moving from the air space in the outer tank to replace the working fluid draining from portions of the transport line in the solar collector when the pump is shut off.

In view of the foregoing, a number of worthwhile objects of the present invention are readily achieved. An apparatus having an expandable outer tank for minimizing pressure therein due to solar heated water is provided. The outer tank is simply and inexpensively constructed since it need not withstand relatively large internal pressures. Additionally, the outer tank can be comprised of a less strong and cheaper material than the inner tank which is subject to pressurized water delivered from an outside source. The solar energy working fluid of the present invention need not be a toxic antifreeze solution. In addition, non-corroding, relatively expensive components need not be used in the present invention inasmuch as the apparatus remains closed to the atmosphere after assembling. The minute volume of oxygen initially present minimally corrodes the apparatus components. The solar energy transport line also transports air, which is present in the outer tank, when the pump is deactivated to permit drainage of the solar energy working fluid from the portions of the transport line located in the solar collector. As a result, no fluid, such as water, can freeze in the transport line during periods of apparatus inactivity. Additional advantages of the present invention will become readily apparent from the following discussion taken in conjunction with the accompanying drawings.

BRIEF DESCRIPTION OF THE DRAWINGS

FIG. 1 is a diagrammatic view of the present invention with a vertical section taken along the outer and inner tanks; and FIG. 2 is an enlarged, vertical section showing the fastening of the lid to the top portion of the outer tank.

DESCRIPTION OF THE PREFERRED EMBODIMENT

In accordance with the present invention, a heating apparatus is provided which utilizes solar energy to heat a fluid. The apparatus includes a solar collector 10, which is preferably a flat plate collector for receiving the rays of the sun. A transport or conveying line 12 is connected to the solar collector 10 and extends throughout the longitudinal extent of the solar collector 10. It is understood that the solar collector 10 may comprise a number of interconnected, separate solar collector plates wherein the transport line 12 forms a path therethrough. However, the solar collector 10 must be suitable for draining the solar energy working fluid from the portions of the transport line 12 located in the solar collector 10. The transport line 12 carries a solar energy working fluid, preferably water, to be heated by the energy of the sun. The transport line 12 includes a first channel 14 which is located between a first side of the solar collector 10 and a bottom portion of outer or first tank 16. An opening is formed in the bottom portion of outer tank 16 and a coupling member 18 is sealingly inserted therein. The first channel 14 is joined to the coupling member 18 so that fluid leaks outside of the transport line 12 at this juncture are prevented. A pumping mechanism 20 is connected between portions of first channel 14. The pumping mechanism is preferably a Grundfos Model Number UPS 20-42 FA or UP 25-42SF. The pumping mechanism 20 pumps the fluid from the bottom portion of the outer tank 16 to the solar collector 10 through the transport line 12.

The transport line 12 further includes a second channel 22 which is positioned between a second side of the solar collector 10 and a top portion of outer tank 16. The second channel 22 is connected to the outer tank top portion above the level of the working fluid contained in the outer tank 16 so that the working fluid exits an outlet end of the second channel above the outer tank working fluid level. The second channel outlet end is at least two inches above the level of the working fluid. As a consequence, the height or vertical distance from the outlet end to the uppermost portion of the transport line 12 is at least two inches less than the height between the level of working fluid in the first channel 14 and the uppermost portion of the transport line 12 after draining of the working fluid. An opening is formed in the top portion of outer tank 16 and a coupling member 24 is sealingly inserted therein to receive the second channel 22 so that air leaks are prevented through the outer tank opening.

The outer tank 16 is generally cylindrical in shape and made of galvanized steel having thickness of approximately 0.03 inches. A lid or cap portion 26 is fastened to the top portion of outer tank 16. The lid 26 is joined to the outer tank top portion by means of a ring 28 releasably inserted into a recess formed in a gasket 30, as best seen in FIG. 2. The gasket 30 is mounted on the top portion of outer tank 16 outwardly thereof and below rim 32 of the outer tank top portion. The ring 28 is positioned about the lid 26 and, in combination with the gasket 30, provides an air tight seal around the rim 32 to prevent the passage of air into the outer tank 16. The lid 26 is generally flat and planar and made of a resilient material, such as butadiene acrylonitrile copolymer (NBR), to permit variation of the volume of outer tank 16. The lid 26 is relatively thin, having a thickness of approximately 1/32 of an inch. Although the lid 26 is illustrated as being completely resilient, it is understood that only a portion of the lid 26 need be expandable. For example, the lid 26 could include pleated sides to provide the expansion capability. Further, the entire lid 26 could be rigid and a hollow receptacle essentially devoid of air could be provided to communicate with the air space and alleviate pressure increases within the outer tank 16.

Housed within the outer tank 16 is an inner or second tank 34 having an inlet member 36 and an outlet member 38. The inlet member 36 is sealingly positioned through a hole in the inner tank 34 and extends through an aperture in the outer tank 16. A joining member 40 is inserted in the aperture of the outer tank 16 about the inlet member 36 to prevent the passage of air and other fluids through the hole. The inlet member 36 carries a pressurized fluid from an outside source, for example, water from a well or from a municipal water treating system, and conveys the pressurized fluid into the inner tank 34. The outlet member 38 also sealingly extends through a hole formed in the inner tank 34. The outlet member 38 further extends through an aperture in the outer tank 16. A joining member 42 is inserted in the outer tank aperture to prevent the passage of air and other fluids through the aperture. The outlet member 38 carries the fluid from the inner tank 34 to a building piping system or to an auxiliary tank. The auxiliary tank can be a conventional water heating system for use when the rays of the sun are insufficient to properly heat the solar energy working fluid. A support stand 44 is positioned within the outer tank 16 at the bottom portion thereof to provide support to the inner tank 34.

The inner tank 34 is generally cylindrical in shape having a thickness substantially greater than that of the outer tank 16. The inner tank 34 is rigid, fixed in shape and dimension to adequately receive and contain the pressurized fluid entering thereto from the outside source. The inner tank 34 is impervious so that the solar energy working fluid contained in the outer tank 16 does not flow into the inner tank 34. The inner tank 34 is usually a standard domestic hot water heating tank having an inner glass-lined wall and an outer wall made of steel, the thickness of the steel being about 0.13 inches. The use of the two separate outer and inner tanks enables pressurized water to be fed into the rigid, inner tank 34 while the outer tank 16 remains virtually free of internal pressures. Additionally, the use of the inner tank 34 permits drain down of the solar energy fluid into the outer tank 16 since the outer tank 16 is not subject to the back pressure provided by the outside fluid source.

A controller 46 is provided to regulate the pumping or driving action of pumping mechanism 20. The controller 46 is a proportional differential thermostat identified as Model Number RS-504-PH 160 and made by Rho Sigma of California. This controller 46 was devised to permit variable pumping action depending upon the solar energy being received. During cloudy conditions in the sky, the controller 46 would cause the pumping mechanism to reduce its pumping action and, consequently, the flow rate of the fluid to be heated. The controller 46 includes an electric pump lead 48 fastened to the pumping mechanism 20 for regulating the pumping action thereof. The controller 46 also includes a storage temperature sensor 50 mounted on the outside wall of the outer tank 16 to sense the temperature of the solar energy working fluid at the bottom portion of the outer tank 16. The controller 46 further includes a collector temperature sensor 52 mounted on the transport line 12 immediately adjacent or within the solar collector 10 to sense the temperature of the solar energy working fluid exiting the solar collector 10. The difference in the temperatures sensed by the storage and collector temperature sensors 50, 52 controls the magnitude of the flow rate of solar energy working fluid by means of the pumping mechanism 20. The greater the temperature difference, the larger in magnitude is the flow rate. When the temperature of the solar energy working fluid is raised quickly by solar energy, the solar energy working fluid passes relatively rapidly through the transport line 12 within the solar collector 10. Significant to the present invention, the controller 46 reduces electrical power usage of the pumping mechanism 20 by chopping the signal powering the pumping mechanism 20 once the transport line 12 starts to convey essentially all working fluid. This result is possible because of the siphoning return action present in the closed system of this invention, as will be subsequently described.

In operation of the apparatus, the solar energy working fluid or water to be heated is first placed between the inner wall of the outer tank 16 and the outer wall of inner tank 34. The level of the solar energy working fluid is below the outlet end of the second channel 22 placed in the outer tank 16. The pumping mechanism 20 is activated or turned on and draws the solar energy working fluid from the bottom portion of the outer tank 16. The pumping mechanism drives the working fluid through the first channel 14 into the solar collector 10. The sun's energy raises the temperature of the solar energy working fluid. The heated working fluid continues its movement through the second channel 22 until it exits into the outer tank 16 from the second channel outlet end.

During the period of time just after the pumping mechanism 20 is turned on, the transport line 12 carries both working fluid and an air portion above the level of the working fluid. As the pumping mechanism 20 continues to pump the working fluid, eventually the transport line 12 contains virtually all working fluid. At this time, the siphoning return action of second channel 22 in the closed system reduces the pumping action required to move the working fluid through the solar collector 10 thereby minimizing the electrical power used by the pumping mechanism 20.

The wall of the inner tank 34 acts as a heat exchanger such that the temperature of the outside source fluid contained in the inner tank 34 is increased by the heated solar energy working fluid contained in the outer tank 16. As the pumping mechanism 20 continues to pump the solar energy working fluid from the bottom portion of the outer tank 16, the solar energy working fluid heated by the sun's rays moves downwardly of the outer tank 16 and exchanges its heat with the fluid contained in the inner tank 34. The temperature of the solar energy working fluid located at the bottom portion of the outer tank 16 is substantially less than the temperature of the solar energy fluid just entering the top portion of outer tank 16 because of the lateral exchange of solar energy by the working fluid and the inherent stratification of working fluid layers, with the warmer working fluid vertically above the relatively cool working fluid layers.

During the heating of the solar energy working fluid, the volume of the air space between the level of the solar energy working fluid and the underside of the lid 26 increases. The increased volume occurs because the increasing temperature of the solar energy working fluid and the air space immediately thereabove results in an increased pressure present in the air space of outer tank 16. As a consequence, the lid 26 rises or expands from its generally flat or concave configuration, as illustrated by the phantom lines of FIG. 1, to the dome-shaped or convex configuration, as illustrated by the solid lines of FIG. 1. The variable volume capability of the outer tank 16 enables it to be made of a thinner material since the pressure exerted therein is minimized. As a consequence, the material from which the outer tank 16 is made need not withstand the changing pressure resulting from the change in the temperature of the solar energy working fluid. Rather, the internal pressure of the outer tank remains at or below 0.5 psi. The cost of the outer tank is substantially reduced through the use of a relatively weaker tank material while the lid 26 is also made from a material less expensive than the outer tank material.

Upon deactivation of the pumping mechanism 20, the solar energy working fluid circulating through the transport line 12 drains back into the outer tank 16 from portions of the transport line 12 within the solar collector 10 and which are located above the level of the solar energy working fluid contained in the outer tank 16. The solar energy working fluid located between the uppermost portion of the transport line 12 and the outlet end of second channel 22 drains back through second channel 22 into the outer tank 16. The working fluid located between the uppermost portion of the transport line 12 and the level of the working fluid in outer tank 16 drains back through first channel 14 until the working fluid in the first channel 14 is level with the working fluid in outer tank 16. This draining back of the working fluid is a result of the difference in height or vertical distance from the uppermost portion of the transport line 12 to the second channel outlet end and to the level of the solar energy working fluid in the outer tank 16. This difference in height enables air bubbles to move in a direction from the second channel outlet end to the uppermost portion of the transport line 12. The air bubbles are provided by the air space above the level of the working fluid and act as a vacuum breaker in the transport line 12 for displacing the working fluid present therein. The removal of the working fluid from portions of the transport line 12 prevents freezing of the working fluid therein when the solar energy working fluid employed is water. The use of water also avoids the risks of using a toxic anti-freeze solution as well as reducing the increased cost and maintenance inherent in the use of a solar heating system having an anti-freeze solution.

The use of the second channel 22 for the additional purpose of transporting air bubbles to displace the working fluid then present also minimizes the number of apparatus components and the cost of the heating apparatus. Moreover, the use of the second channel 22 to carry air into the transport line 12 obviates the need for a vent openable to outside air for assisting in the drain back operation. Since the apparatus of the present invention is closed to outside air, corrosion of the inner wall of outer tank 16 and the outer wall of inner tank 34 is minimized. The minute amount of air with oxygen initially present in the outer tank 16 quickly reacts so that only a minimal amount of rust or corrosion occurs. After this oxygen is spent, the apparatus remains free of inward corrosive action because of the air tight seals provided.

Based on the foregoing description, a number of benefits and advantages of the present invention are readily seen. A simply made but efficient heating apparatus is provided for using solar energy to heat a fluid. The apparatus can be constructed of locally manufactured or readily available materials to reduce or eliminate the cost involved in the shipping of manufactured materials and also minimize assembly time. The apparatus includes an outer tank made of an inexpensive, relatively thin galvanized sheet steel material having a variable volume. The volume is varied by means of an inexpensive, resilient lid which is air tightly fastened to the outer tank. When the temperature of the fluid heated by the rays of the sun increases, the volume of the outer tank increases to prevent an increase in pressure. The expandable lid also minimizes the possibility of the outer tank suddenly rupturing as a result of too great an internal pressure if, for example, the inner tank leaks fluid into the outer tank. Rather, if the pressure within the outer tank becomes too great, the increasing volume of fluid would cause the elastic lid to rupture. The essentially unpressurized outer tank, the lack of a heat exchanger in the path or loop of the solar energy working fluid, and the pumping of the solar energy working fluid from the bottom portion of the outer tank increase the efficiency of the solar collector inasmuch as only relatively cool fluid flows into the solar collector for heating. The present invention also minimizes the cost and maintenance thereof by employing water as the medium for receiving the solar energy. Corrosion of the apparatus is greatly minimized since a heating system closed to outside air is provided. In addition, the cost is further reduced since the outer and inner tanks as well as the pumping mechanism need not be made of relatively expensive stainless steel materials. The present invention further utilizes a portion of the solar energy transport line to feed back air to permit proper fluid draining of portions of the transport line so that freezing of the fluid therein is prevented. The controller with temperature sensors, together with the siphoning return action of the closed system of the present invention, minimizes the electrical power consumption of the pumping mechanism. Unlike previous drain back systems, the pumping mechanism need not be fully on whenever the heating apparatus is operating. Although the cylindrical, inner tank could be replaced by a coil of copper piping, for example, a cylindrical tank is better suited for rapid heat exchange because of the large tank wall surface area. Additionally, an expected use of the heated water, such as for bathing, is better satisfied by a large containing structure because all of the heated batch is available and the heat exchange is not limited by high flow rates which are frequently demanded by the user of the heated water.

Although the foregoing invention has been described with reference to a particular embodiment thereof, it is readily appreciated that variations and modifications can be effected within the spirit and scope of this invention.

I claim:

1. A solar energy heating apparatus including a solar collector for use in raising the temperature of a solar energy working liquid moving through the solar collector, comprising:

a variable volume outer tank in the path of movement of the solar energy working liquid for containing the solar energy working liquid, said outer tank having a top portion, a bottom portion, a body wall and including an expandable lid having an underside, said expandable lid being removably and sealably fastened to said top portion of said outer tank, an air space being defined between the level of the solar energy working liquid in said outer tank and said underside of said lid, said lid being expandable to accommodate increasing pressure within said outer tank resulting from increases in temperature of the solar energy working liquid in said outer tank;

an inner tank heat exchanger completely contained within said outer tank and completely surrounded by the solar energy working liquid but impervious thereto, said inner tank being entirely rigid and having a substantially greater thickness than said outer tank to withstand the input of pressurized fluid to said inner tank, said inner tank having an inlet member for receiving a fluid and an outlet member for discharging the fluid, said inlet member and said outlet member each extending through said body wall of said outer tank, the temperature of the fluid contained in said inner tank depending upon the temperature of the solar energy working liquid;

means connected to said outer tank for conveying the solar energy working liquid from said bottom portion of said outer tank through the solar collector and for conveying the solar energy working liquid from the solar collector to said top portion of said outer tank to provide a circuitous path for the solar energy working liquid, said conveying means including a channel having an outlet end from which the solar energy working liquid exits into said outer tank, the vertical distance from said outlet end to an uppermost vertical portion of said channel being less than the vertical distance from said uppermost vertical portion to the level of the solar energy working liquid housed in said outer tank; and means connected to said conveying means for driving the solar energy working liquid through said conveying means.

* * * * *